US011965619B2

(12) United States Patent
Hall et al.

(10) Patent No.: US 11,965,619 B2
(45) Date of Patent: Apr. 23, 2024

(54) HEAT EXCHANGER TUBE PLUG INSTALLATION

(71) Applicant: EST Group, Inc., Hatfield, PA (US)

(72) Inventors: Andrew Hall, Ottsville, PA (US); Alex Kotlyar, Jamison, PA (US); Ka'ren Sarkissian, Langhorne, PA (US)

(73) Assignee: EST GROUP, INC., Hatfield, PA (US)

( * ) Notice: Subject to any disclaimer, the term of this patent is extended or adjusted under 35 U.S.C. 154(b) by 0 days.

(21) Appl. No.: 18/129,927

(22) Filed: Apr. 3, 2023

(65) Prior Publication Data
US 2023/0235845 A1 Jul. 27, 2023

Related U.S. Application Data

(62) Division of application No. 17/395,568, filed on Aug. 6, 2021, now Pat. No. 11,788,663.

(51) Int. Cl.
G06F 16/904 (2019.01)
B21D 53/02 (2006.01)
B23P 15/26 (2006.01)
F16L 55/11 (2006.01)
F28F 11/02 (2006.01)
G06F 3/0482 (2013.01)
G06F 16/907 (2019.01)

(52) U.S. Cl.
CPC .............. F16L 55/11 (2013.01); B21D 53/02 (2013.01); B23P 15/26 (2013.01); F28F 11/02 (2013.01); G06F 3/0482 (2013.01); G06F 16/904 (2019.01); G06F 16/907 (2019.01)

(58) Field of Classification Search
CPC F16L 55/11; B21D 53/02; B23P 15/26; F28F 11/02; G06F 3/0482; G06F 16/904; G06F 16/907
See application file for complete search history.

(56) References Cited

U.S. PATENT DOCUMENTS

| 4,425,943 A | 1/1984 | Martin |
| 4,436,117 A | 3/1984 | Martin |
| 5,437,310 A | 8/1995 | Cunningham |
| 2003/0125884 A1 | 7/2003 | Linsen et al. |
| 2005/0154564 A1* | 7/2005 | Le .................... G01N 27/902 702/189 |

(Continued)

OTHER PUBLICATIONS

USA Industries; https://usaindustries.com/snap-it-engineered-tube-plugs/snap-it-sr-expanding-tube-plug/—Find your Snap It Sr Part #; (Year: 2021).*

(Continued)

Primary Examiner — Lee A Holly
(74) Attorney, Agent, or Firm — Howson & Howson LLP

(57) ABSTRACT

A method of tube plug installation in a heat exchanger or pressure vessel is provided. The method includes verifying the suitability of a selected tube plug with a specifically identified type of heat exchanger or pressure vessel before installation of the selected tube plug. The step of verifying being performed with a device having an app, software, or user interface and after having entered or accessed data concerning the selected tube plug and entering or accessing data concerning the specifically identified type of heat exchanger or pressure vessel and operating parameters of the specifically identified type of heat exchanger or pressure vessel.

13 Claims, 16 Drawing Sheets

(56) References Cited

U.S. PATENT DOCUMENTS

| | | | | |
|---|---|---|---|---|
| 2008/0055273 A1* | 3/2008 | Forstall | ............... | G06F 3/04817 |
| | | | | 345/173 |
| 2008/0319562 A1* | 12/2008 | Forstall | ................. | G09G 5/006 |
| | | | | 700/94 |
| 2011/0113613 A1* | 5/2011 | Gamboa | ................ | B25B 21/00 |
| | | | | 29/700 |
| 2012/0089346 A1 | 4/2012 | Huyse et al. | | |
| 2014/0333525 A1 | 11/2014 | Gromes, Sr. et al. | | |
| 2018/0280914 A1 | 10/2018 | Victor et al. | | |

OTHER PUBLICATIONS

International Search Report and Written Opinion of the International Searching Authority issued for International PCT Application No. PCT/US2022/039231 dated Nov. 21, 2022.

* cited by examiner

3D Barcode

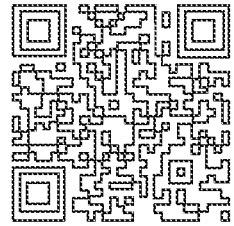

- Lot Number
- Stock Code
- BAW Force
- Rated Pressure
- Hydrotest Pressure
- Rated Temperature
- Pin Material (ASME/ASTM, UNS, Description)
- Ring Material (ASME/ASTM, UNS, Description)
- Manufacturing Date
- *The 3D barcode to be included to the box (label) and printed on Certificate of Quality*

FIG. 9

Lot Number Cloud Table

- Lot Number
- Stock Code
- BAW Force
- Rated Pressure
- Hydrotest Pressure
- Rated Temperature
- Pin Material (ASME/ASTM, UNS, Description)
- Ring Material (ASME/ASTM, UNS, Description)
- Manufacturing Date
- *Provides accurate / up to date information for installation acceptancy criteria (including non-standard BAW configurations and specials plugs)*

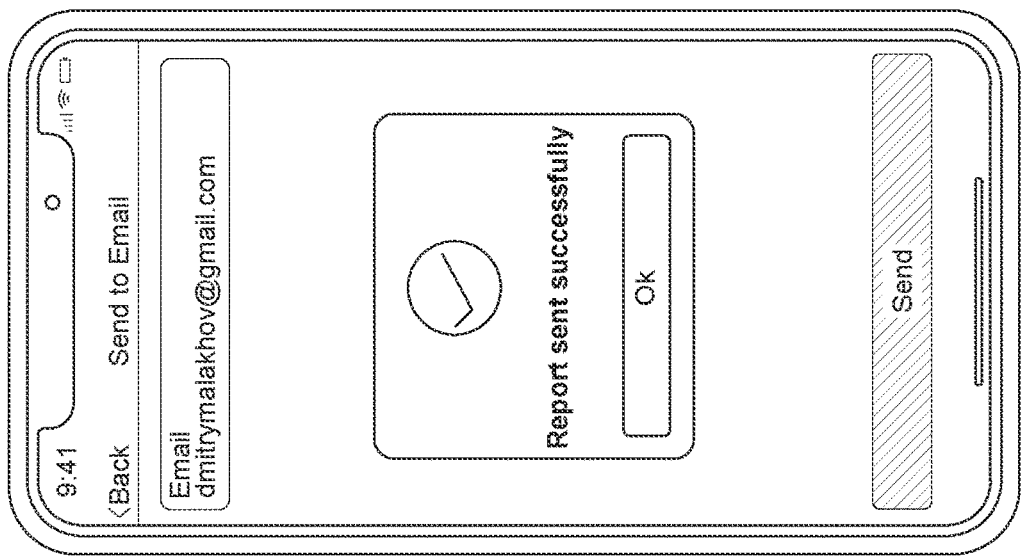
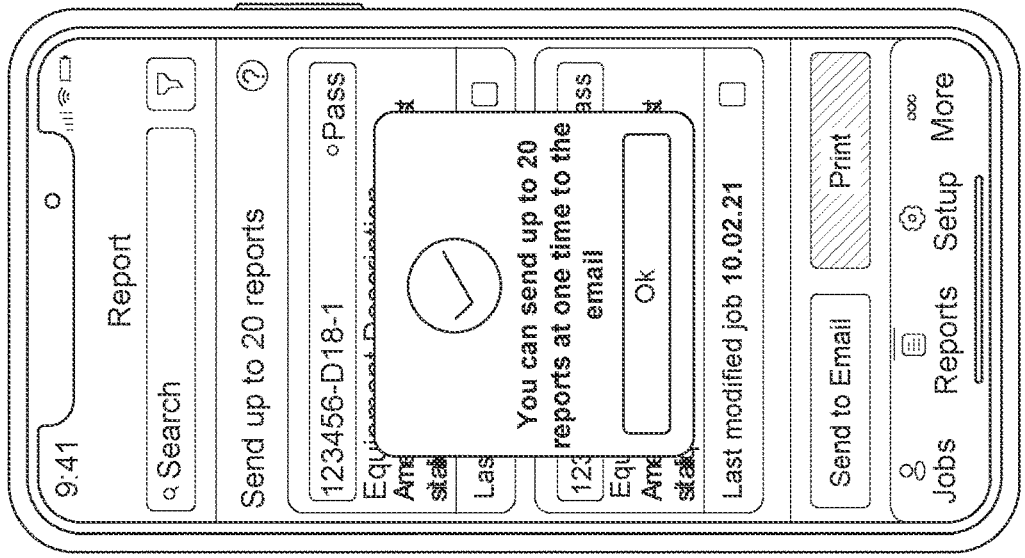
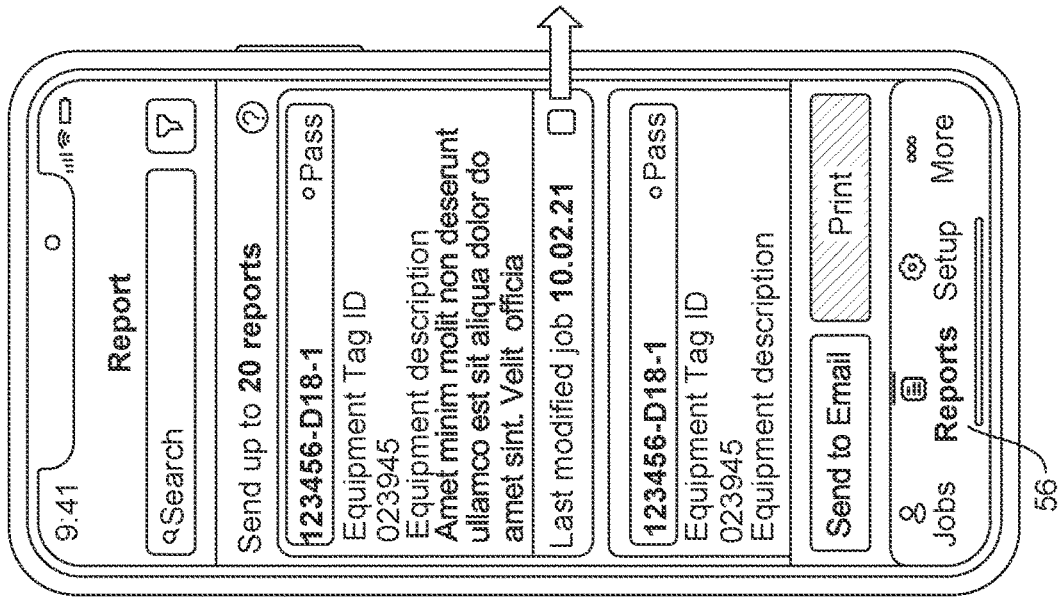
FIG. 12

# HEAT EXCHANGER TUBE PLUG INSTALLATION

CROSS REFERENCE TO RELATED APPLICATIONS

This application is a divisional of co-pending U.S. application Ser. No. 17/395,568 filed Aug. 6, 2021.

BACKGROUND

The present invention relates to the installation of heat exchanger tube plugs, and more particularly, the present invention relates to a method of confirming and reporting successful tube plug installation and equipment or devices capable of recording or transmitting tube plug installation data.

Mechanically expanded heat exchanger tube plugs are used to block off tubes in heat exchangers and pressure vessels, usually due to damage or wear.

By way of example, shell and tube-type heat exchangers customarily comprise a bundle of tubes mounted in spaced parallel relation at opposite ends in tube sheets. The tube bundle is surrounded by a shell through which a medium is flowed between an inlet and an outlet of the shell. Heads are provided on opposite ends of the shell to afford the flow of another medium through the interior of the tube bundles. In multiple pass heat exchangers, one head end of the heat exchanger may be provided with flow reversing means to cause the fluid to flow within selected tubes and make several passes before exiting the heat exchanger.

Heat exchangers of the above type have been known to fail in use and to require repair. Generally, this is accomplished by removing the head at opposite ends of the tube, and either removing, or replacing, the defective tube, or plugging the defective tube. Since such heat exchangers are often integral components of continuous plant processes, it is important that they be repaired quickly within a minimum of downtime.

Various types of plugs are known for sealing off defective tubes. A typical plug assembly comprises a radially deformable ring adapted to be placed in a tube of a heat exchanger in alignment with its tube sheet and an elongated pin having a conical shape with a constant taper along its length which is slidably received within the ring for expanding the ring outwardly when the pin is pulled axially relative to the ring. U.S. Pat. No. 5,437,310 issued to Cunningham and U.S. Pat. No. 4,425,943 issued to Martin provide examples.

As the pin is advanced through the ring, the ring expands and compresses against an inner diameter wall of a tube thereby forming a metal-to-metal seal. A breakaway member is mounted at the narrow end of the pin and is connected to a pull rod which cooperates with a compression tube engaging the sleeve to pull the pin into the ring and expand the ring outwardly to provide a fluid type of joint. After a predetermined amount of outward pressure has been applied, the breakaway ruptures to permit removal of the pull rod and compression tube from within the plugged tube.

Many different permutations of sizes, materials, and plug specifications exist. This is due to the fact that many heat exchangers are custom designed for specific applications. As a result, many varieties of tube sizes, materials, and operating parameters exist.

It is common to find hundreds of different heat exchangers at one site or plant. This is especially true for plants that sustain critical infrastructure, such as refineries, chemical processing plants, conventional power generating stations, and nuclear generating stations. In the case of nuclear generating stations, correct product selection and installation is a matter of public safety. The incorrect use or installation of a tube plug could allow radiation to escape and cause exposure to the public.

These industries desire increased safety, traceability, and reliability, and in the case of heat exchanger tube plugs, providing maximum safety requires the correct product choice, the ability to review what type of plug was installed and where, and confirmation that every tube plug was correctly installed.

SUMMARY

According to an aspect of the present invention, a method of tube plug installation in a heat exchanger or pressure vessel is provided. The method includes verifying the suitability of a selected tube plug with a specifically identified type of heat exchanger or pressure vessel before installation of the selected tube plug. The step of verifying is performed with a device having an app, software, or user interface and after having entered or accessed data concerning the selected tube plug and entering or accessing data concerning the specifically identified type of heat exchanger or pressure vessel and operating parameters of the specifically identified type of heat exchanger or pressure vessel.

The method may include a step of confirming tube plug installation success or failure based on at least one real-time measurement taken during installation and an analysis thereof. In addition, the method may include a step of retaining plug installation data and an association with a specific tube location of the heat exchanger or pressure vessel.

According to another aspect of the present invention, a device comprising at least one processor configured to verify suitability of a selected tube plug with a specifically identified type of heat exchanger or pressure vessel before installation of the selected tube plug is provided. The device has at least one of an app, software, or user interface and is configured to receive or access data concerning the selected tube plug and to receive or access data concerning the specifically identified type of heat exchanger or pressure vessel and operating parameters of the specifically identified type of heat exchanger or pressure vessel.

The device may be an electronic device, smartphone, computer, tablet, or laptop or an installation tool configured to obtain real-time measurements of installation parameters. The at least one processor may also be configured to confirm tube plug installation success or failure based on at least one real-time measurement taken during installation and an analysis thereof. The at least one processor may be configured to retain plug installation data and an association with a specific tube location of the heat exchanger or pressure vessel.

BRIEF DESCRIPTION OF THE DRAWINGS

The features and advantages of the present invention should become apparent from the following description when taken in conjunction with the accompanying drawings, in which:

FIG. 9 is an image of a barcode including a list of information contained by the barcode in accordance with an embodiment.

FIG. 10 is a listing of information provided by a lot number table obtainable from a cloud server or the like in accordance with an embodiment.

Figure 11:
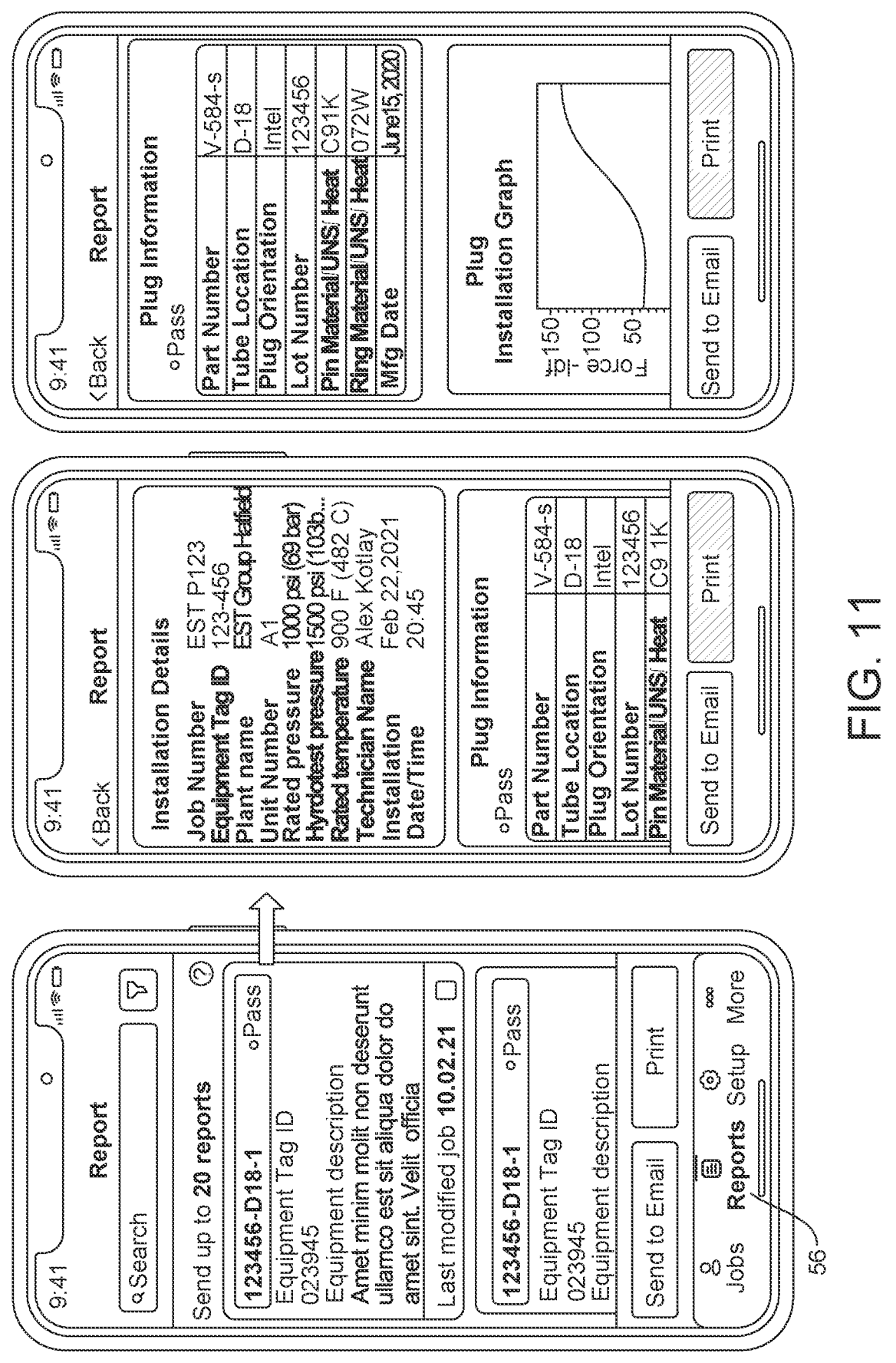

FIG. 11 is an image of a user interface of the App for displaying a report in accordance with an embodiment.

FIG. 12 is an image of a user interface of the App for sending or printing a report in accordance with an embodiment.

DETAILED DESCRIPTION

Figure 1:
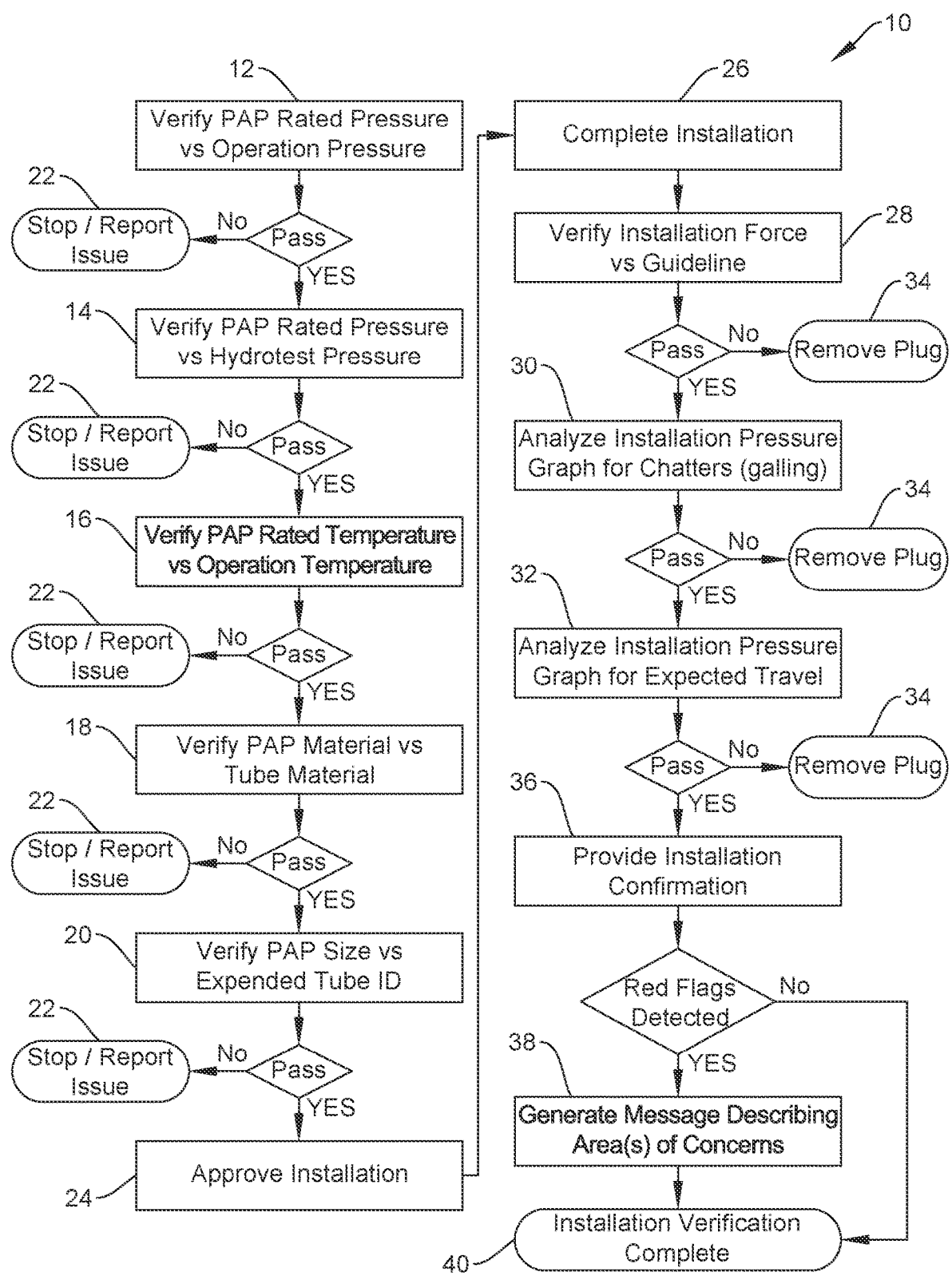
FIG. 1 is a flowchart of a method of verification of correct plug choice and installation according to an embodiment.

While best practices may be available to help installers of tube plugs to prevent incorrect tube plug product selection and installation, there are still opportunities for mistakes to occur when installing a tube plug. In most industries, mistakes are not acceptable, as they cause unplanned outages, damage to equipment, and compromised safety.

Conventional technical guides and resources may assist in correct tube plug product selection. In addition, many mistake proof installation features are designed into the tube plugs themselves. Still, given the conventional state of the art and practices, improvements with respect to installing tube plugs is desired.

Embodiments disclosed herein provide a method enabling installers to readily analyze tube plug installations in heat exchangers and pressure vessels and to determine whether or not the correct repair method is being selected and whether or not an installation was successful. The method may be carried out with software on an electronic device, such as an app on a smartphone or like handheld electronic device, software on a computer, tablet, laptop, or like electronic device, or with the use of a user interface provided on a specialized installation tool, device, or equipment. These devices may provide indications of plug installation status.

Accordingly, embodiments disclosed herein provide a method, software, and devices or tools for informing a plug installer at the time of installation that the plug they have chosen to install is correct, to confirm after installation that all key installation characteristics were acceptable and within a specified range, and/or to document the installation of a plug in a tube as proof that a tube is plugged with a correctly specified and installed plug.

Thus, according to at least some contemplated embodiments, a plug installer may first be provided with the opportunity and ability to verify that the correct and proper tube plug for any given heat exchanger is being installed at the time of installation. Key operating parameters for the heat exchanger may be entered into a database. This may occur at the time of installation or well before installation and such data will be accessible by the software, app, device, or tool. Thus, before installation, the user will use the software, app, tool, or device to make a selection of which specific type of heat exchanger is being plugged and will then enter information about the plugs that have been preliminarily chosen for installation (i.e., by entering a lot number, scanning a bar/QR code, etc.). The working limits of the selected tube plug is automatically compared to the operating limits of the particular heat exchanger by the software or app to confirm that the correct and proper tube plug has been chosen. The software, app, tool, or device may provide visual or audible information to the installer as to whether or not the tube plug selected is acceptable for installation.

The method performed by the software or app may also include the collection of data concerning specific heat exchanger operating parameters, such as design temperature and pressure, and an evaluation of the data relative to tube plug design limits to ensure compatibility. The method performed by the software or app may also include a step of comparing metallurgical properties of the host tubes of the heat exchanger or pressure vessel and selected tube plugs to ensure compatibility. Further, information on tube sizing and tube installation parameters, or actual tube inner diameter (ID) measurements, may be compared to the plug size operating range. After the heat exchanger requirements and information are collected, entered, and evaluated against the tube plug specifications and characteristics, approval to install a plug may be given by the app, software, or user interface of the installation tool.

After the plug choice has been verified as discussed above, the installer designates the tube location relative to the specific heat exchanger or pressure vessel into which the plug is being installed. This allows the app or software to automatically evaluate whether or not a complete heat exchanger repair job was properly accomplished—for instance, it may detect that only one end of a tube was plugged instead of both ends. Additionally, the method using the software or app ensures traceability for which lot of tube plugs was installed in which particular tube. For instance, in the event of a recall of a particular lot of plugs, removing the recalled product would limit the removal of plugs solely to the affected lot as stored by the software or app, and not to all of the plugs in a heat exchanger.

The method carried out by use of the app, software, or the like may include collecting data from the plug installation and evaluating the data to determine if the plug was installed correctly. Tube plugs are essentially "destroyed" when installed. There is no actual way to readily determine whether or not a tube plug has been correctly installed after the installation takes place. The only way to determine this is to collect and evaluate data obtained during the installation process.

For this purpose, the method may use measurable characteristics that will aid in determining whether or not a tube plug has been successfully installed. Lot testing of tube plugs in a laboratory setting is accomplished to ensure performance. The method evaluates this stored data and automatically determines with the software or app whether or not the plug was successfully installed, which allows the end user to "test" every tube plug that is installed in the field.

Further, the method automatically creates and retains records of plug installation data with the software or app for each plugged tube in the heat exchanger. Having the ability to analyze installation data provides advanced troubleshooting capabilities in the event of a plug failure. This enables various types of advanced reporting. Plugs installed per day, per week, per year, per outage, per job, per user, etc. can be reported. The method provides the ability to see how many tubes were plugged at any given time per heat exchanger, so metrics such as process efficiency and plugged tubes can be evaluated. Thus, unprecedented access to plug installation and heat exchanger plugging data is provided via use of the software, app, or specialized installation tool.

According to some embodiments, a specialized device, equipment, or installation tool may be provided for use in collecting data during tube plug installation in a heat exchanger or pressure vessel. The device or installation tool may be able to collect and transmit or communicate this data to another device, such as a smartphone, tablet, computer, server or the like where the data can be analyzed and evaluated against certain criteria. Alternatively, the device, equipment, or installation tool may be a standalone device and may have the capability of analyzing collected data and providing feedback on plug installation. Additional functionality and capabilities may be added to the installation equipment and/or software.

By way of example, FIG. 1 provides logic 10 that may be implemented in software, an app, or the like for use in determining if a plug installation was completely successful. In this example, the installer would first select and enter a selected type of plug and would also identify the particular type of heat exchanger in which the plug is to be installed. Then, the software or app would perform numerous pass/fail verifications. For instance, in step 12, plug rated pressure versus operating pressure that will be experienced by the plug after installation is verified (i.e., pass/fail). In step 14, plug rated pressure versus hydrotest pressure is verified (i.e., pass/fail). In step 16, plug rated temperature versus operating temperature that will be experienced by the plug after installation is verified (i.e., pass/fail). In step 18, compatibility of plug material versus tube material is verified (i.e., pass/fail). In step 20, compatibility of plug size versus expended tube inner diameter (ID) is verified (i.e., pass/fail).

If any of these verifications fail (see steps 22), then the analysis is concluded, and the issue is reported to the installer via a visual or audible indication. If this occurs, the installer must select a different tube plug. The software or app may provide suggestions.

Alternatively, if the selected tube plug passes all the verifications, then installation of the selected tube plug is approved (see step 24) and the approval may be reported to the installer via visual or audible indication. Thereafter, the installation may be completed (see step 26) and then verified. For instance, in step 28, measured installation force used to install the tube plug versus stored guidelines is verified (pass/fail). In step 30, an installation pressure graph for chatters (galling) is analyzed (pass/fail). In step 32, the installation pressure graph for expected travel is analyzed (pass/fail).

If any of these verifications fail (see steps 34), then the analysis is concluded, and the installer is alerted via visual or audible indication to remove the installed plug. If this occurs, the installer must remove the plug, install a new tube plug, and repeat these verifications.

Alternatively, if all of the verifications pass, then a confirmation of the installation is provided in step 36. If any red flags are detected during these verifications, one or more messages are automatically generated in step 38 and provided to the user on a display of the device or the like. The messages may describe the area of concern detected. Whether or not any red flags are generated, the process proceeds to step 40 which provides an indication that installation verification has been successfully completed.

As stated above, all or some of the above steps may be performed on an app of smartphone or the like, software of a computer or the like, or via a user interface provided on specialized equipment, devices, or tools.

Figure 2:
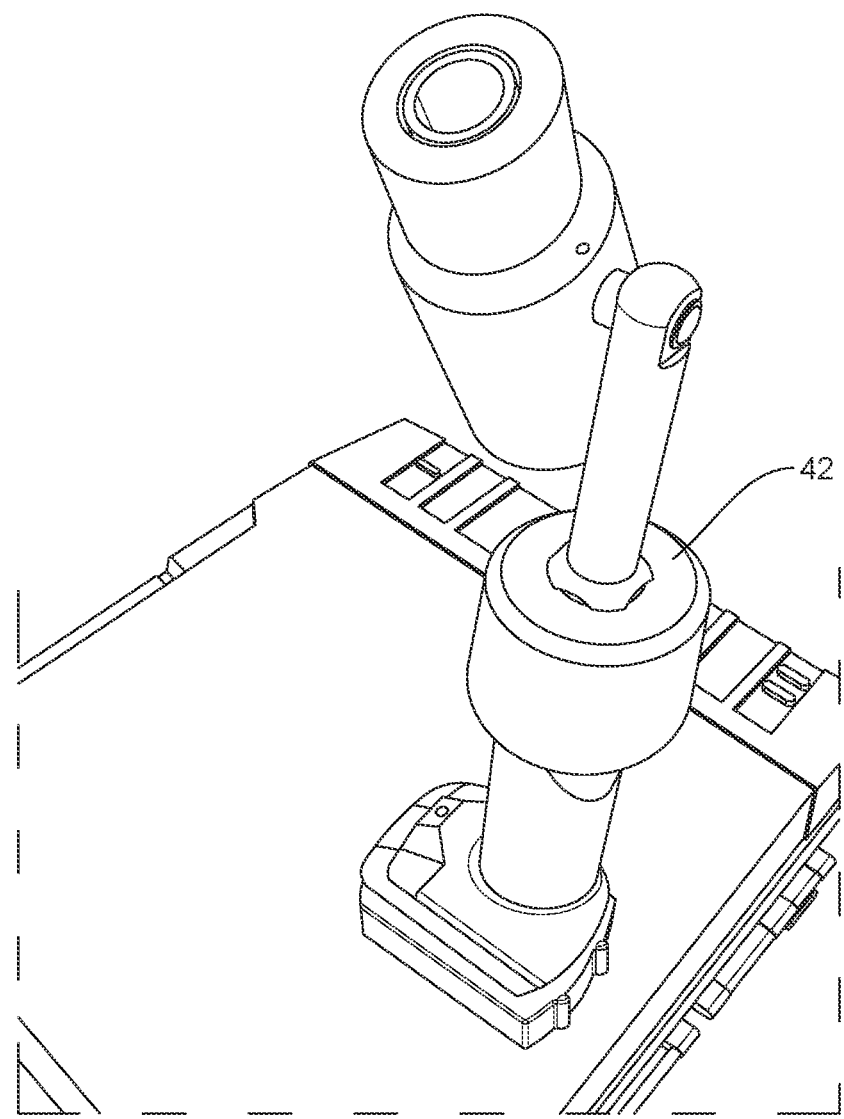
FIG. 2 is an image of an installation tool for capturing data, measuring installation parameters, and/or for reporting installation parameters according to an embodiment.

FIG. 2 provides an example of an installation tool 42 for use by the installer for accomplishing all or some of the steps of the above referenced process. The tool 42 may automatically capture data during an installation process and may have wireless communication abilities or the like. For instance, the data may include actual measured installation force, travel, or the like. The tool 42 may transmit these measurements to a device provided with the app or software or may be a standalone tool and contain processors or the like used to analyze the data.

Figure 3:
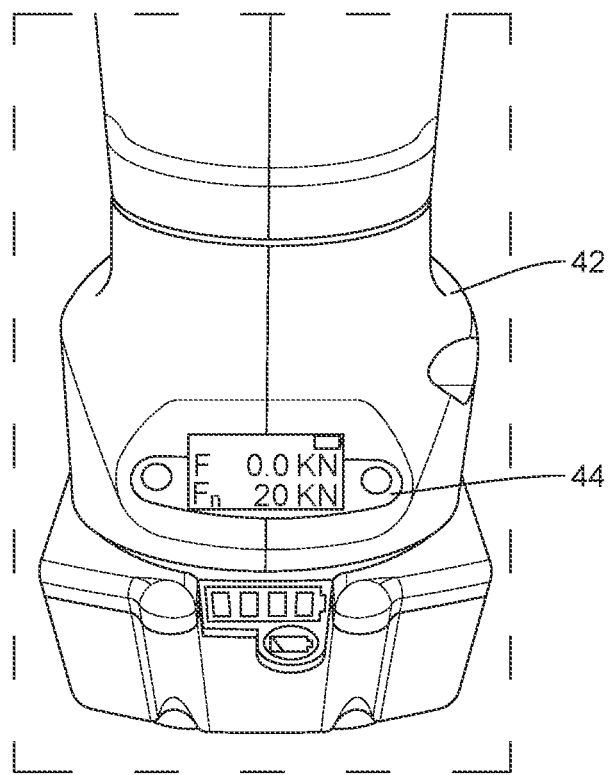
FIG. 3 is an image of the user interface on the tool of FIG. 2 according to an embodiment.
Figure 4:
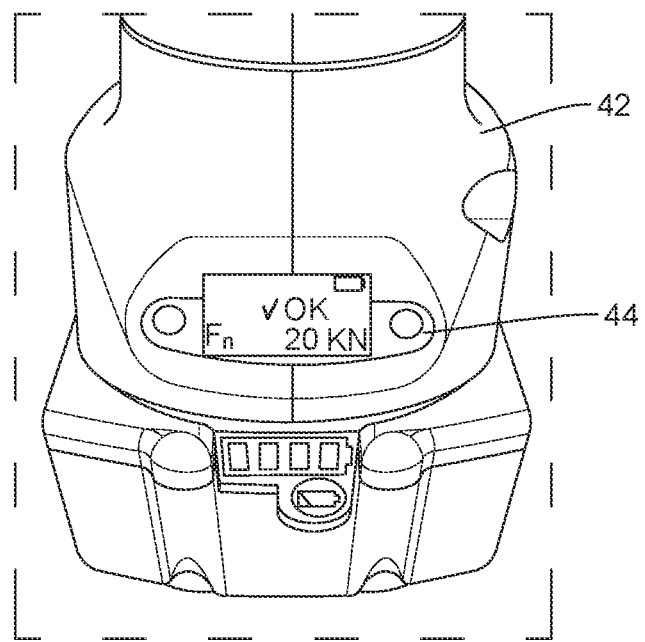
FIG. 4 is an image of the user interface of FIG. 3 providing feedback after plug installation according to an embodiment.

FIG. 3 shows a part of the tool 42 having a user interface display screen 44 that shows measured data (i.e., installation force). FIG. 4 shows the user interface display screen 44 after installation of a tube plug displaying feedback concerning the installation (i.e., "OK" or not OK).

In view of the foregoing, it should be apparent that embodiments disclosed herein provide a Tube Plug Installation app, software, or device which can be used to confirm and report successful tube plug installation.

A device or system for carrying out any of the above disclosed embodiments, methods, or arrangements may include software or the like provided on a circuit board or within another electronic device and can include various processors, microprocessors, modules, units, components, controllers, chips, disk drives, communication circuits, and the like. It will be apparent to one of ordinary skill in the art that systems, modules, components, units, processors, servers, and the like may be implemented as electronic components, software, hardware or a combination of hardware and software for purposes of providing a system.

Embodiments may also include at least one non-transitory computer readable storage medium having computer program instructions stored thereon that, when executed by at least one processor, can cause the at least one processor to perform any of the steps described above.

Example—User Interface

By way of example and not by way of limitation, FIGS. 5-16 show a device 50, such as a smartphone, on which an App is installed and show various graphical user interfaces and screen views that may be presented to a user of the App. The App enables data to be captured during installation of plugs or like products that are actually being installed and used in a heat exchanger or pressure vessel. The App permits reports to be generated and printed or electronically forwarded, setup procedures to be accomplished, details concerning new or existing installation jobs to be entered, as well as additional options. Accordingly, as discussed above, the App can be used to provide confirmation of proper or acceptable installation, generate reports, ensure process traceability and conformance, and simply installation process.

Figure 5:
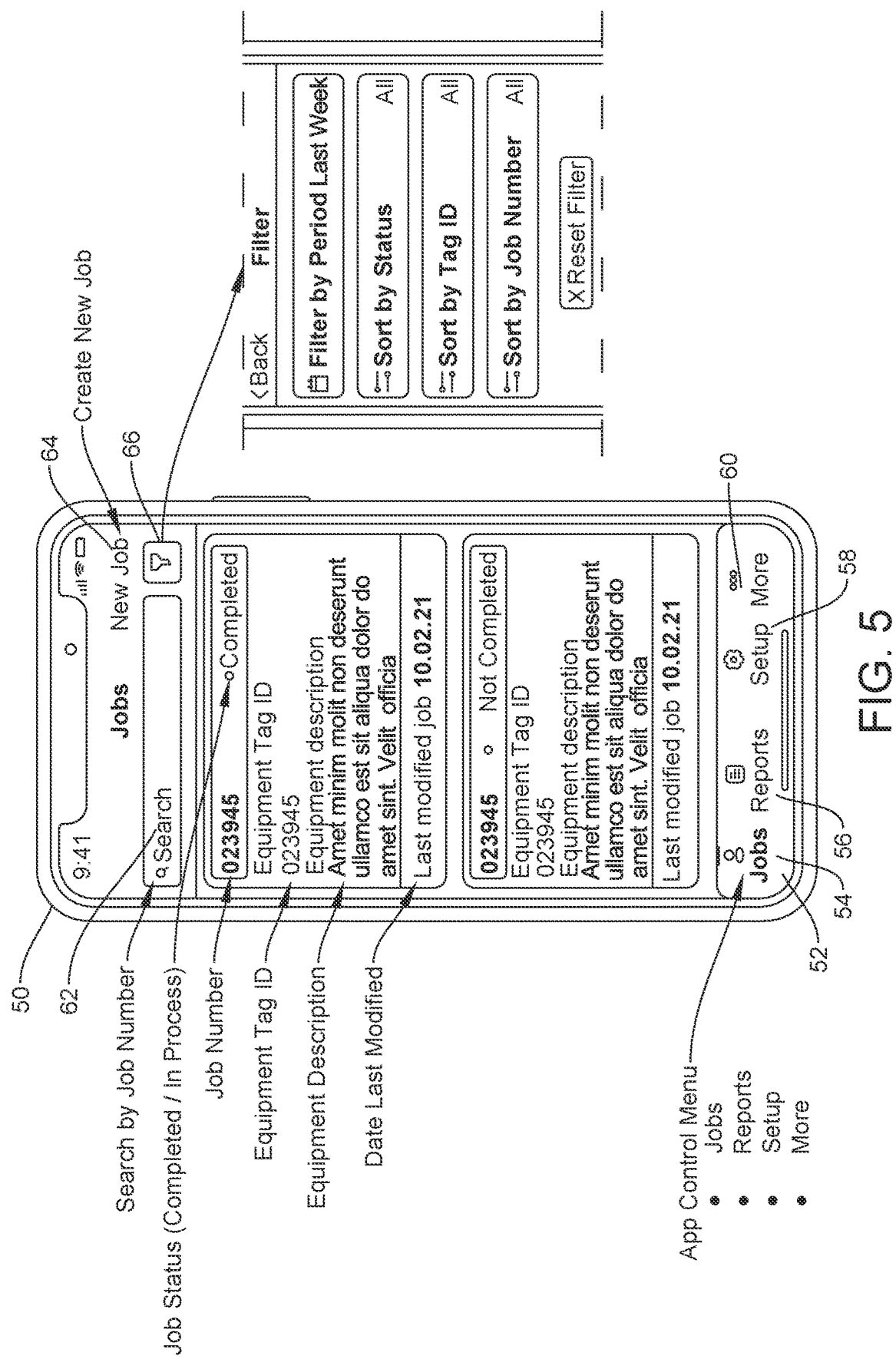
FIG. 5 is an image of a user interface of an App for use in searching, selecting, or adding a job number according to an embodiment.

As best shown on FIG. 5, the App or software may be downloaded onto the device 50, such as a smartphone. The user interface of the App may include an App control menu 52 including multiple icons, such as one each for "Jobs" 54, "Reports" 56, "Setup" 58, and "More" 60. If the "Jobs" icon 54 is selected, an interface such as shown in FIG. 5 may be presented. This interface may include a search line 62 permitting a search for a particular job number. If the job number is located, information concerning job status (completed or in process), equipment job ID, equipment description, date the job was last modified, and the like may be displayed. See FIG. 5. The interface may also include a "New Job" icon 64 which enables a new job number to be created, and the interface may include a filter icon 66 enabling a search of stored job entries by date period or the like and sorted by status, equipment tag ID, job number or the like.

Figure 6:
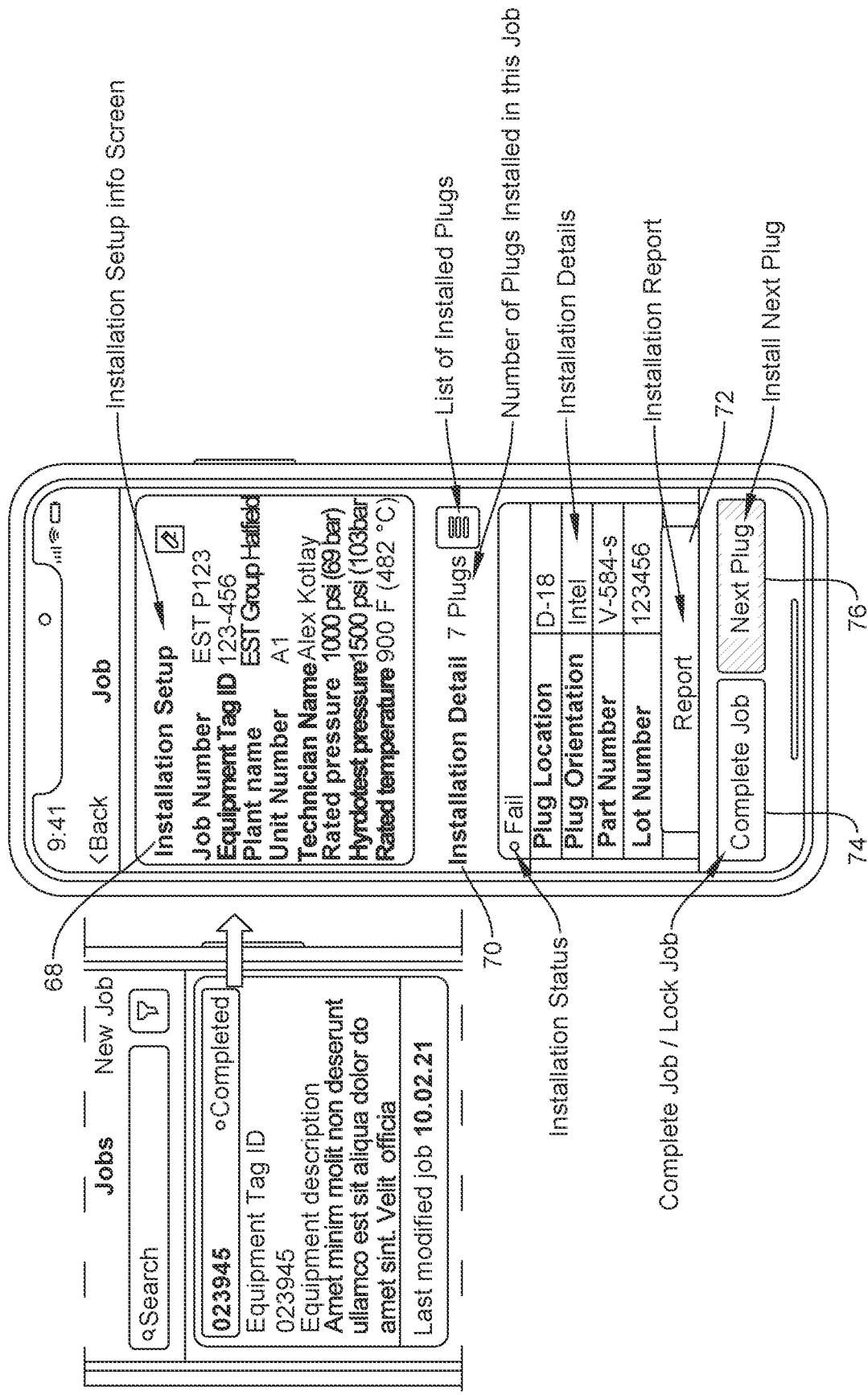
FIG. 6 is an image of a user interface of the App for use in displaying information concerning installation setup and details of a job number in accordance with an embodiment.

If a particular job number is selected, for instance as shown in FIG. 6, information concerning "installation setup" 68 may be displayed. This may include, for instance, job number, equipment tag ID, plant name, unit number, technician name, rated pressure, hydrotest pressure, rated temperature, and the like. In addition, information concerning "installation details" 70 may be displayed. This may include the number of plugs installed in the selected job, a link to a list of installed plugs, installation status (pass or fail), plug location, plug orientation, plug part number, plug lot number, and the like. An installation report icon 72 may be provided for obtaining and/or generating an installation report. In addition, a complete or lock job icon 74 or install next plug icon 76 may also be provided to complete or lock a current job or to enter data concerning a next plug to be installed.

Figure 7:
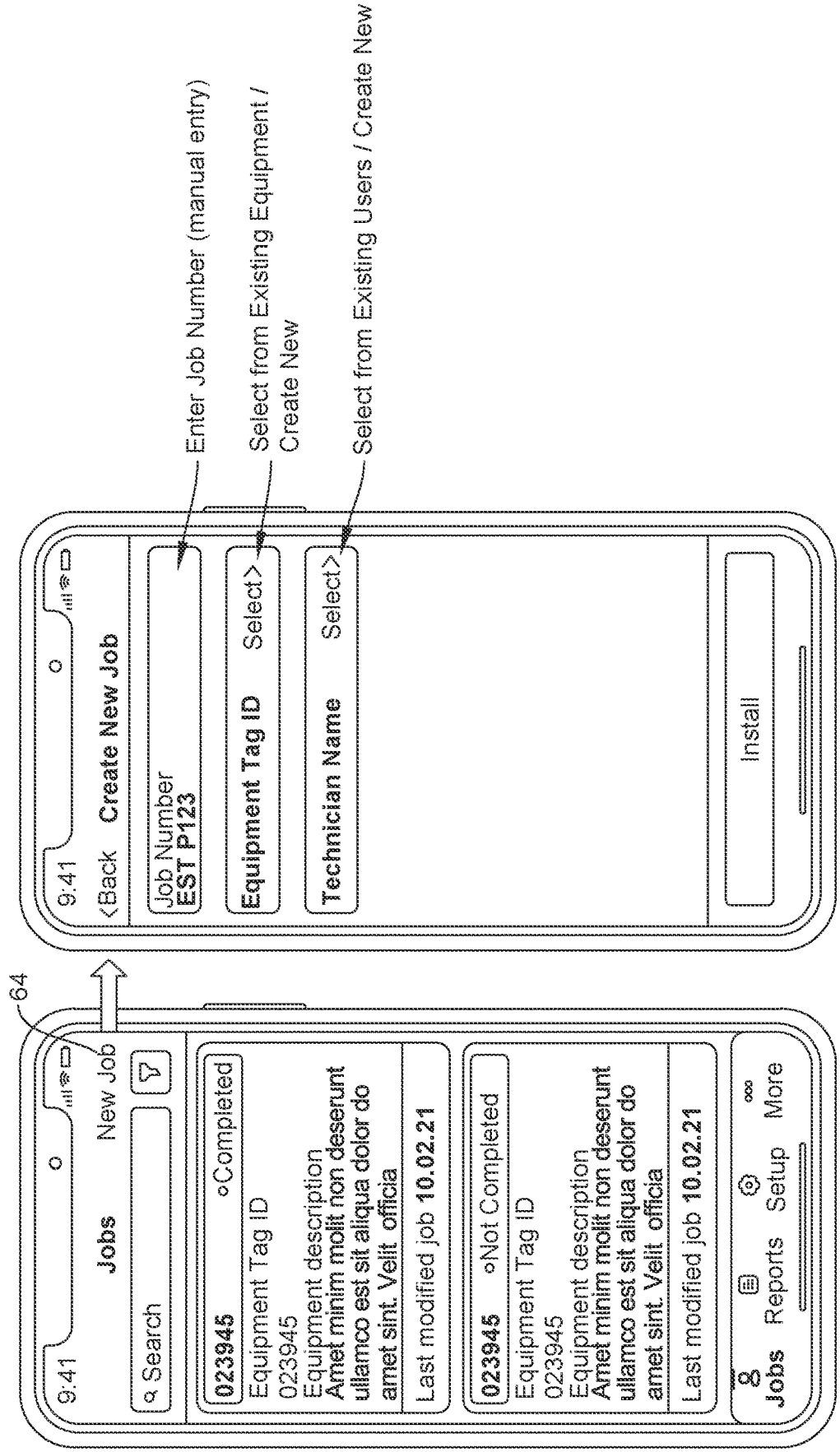
FIG. 7 is an image of a user interface of the App for use creating a new job number in accordance with an embodiment.
Figure 8:
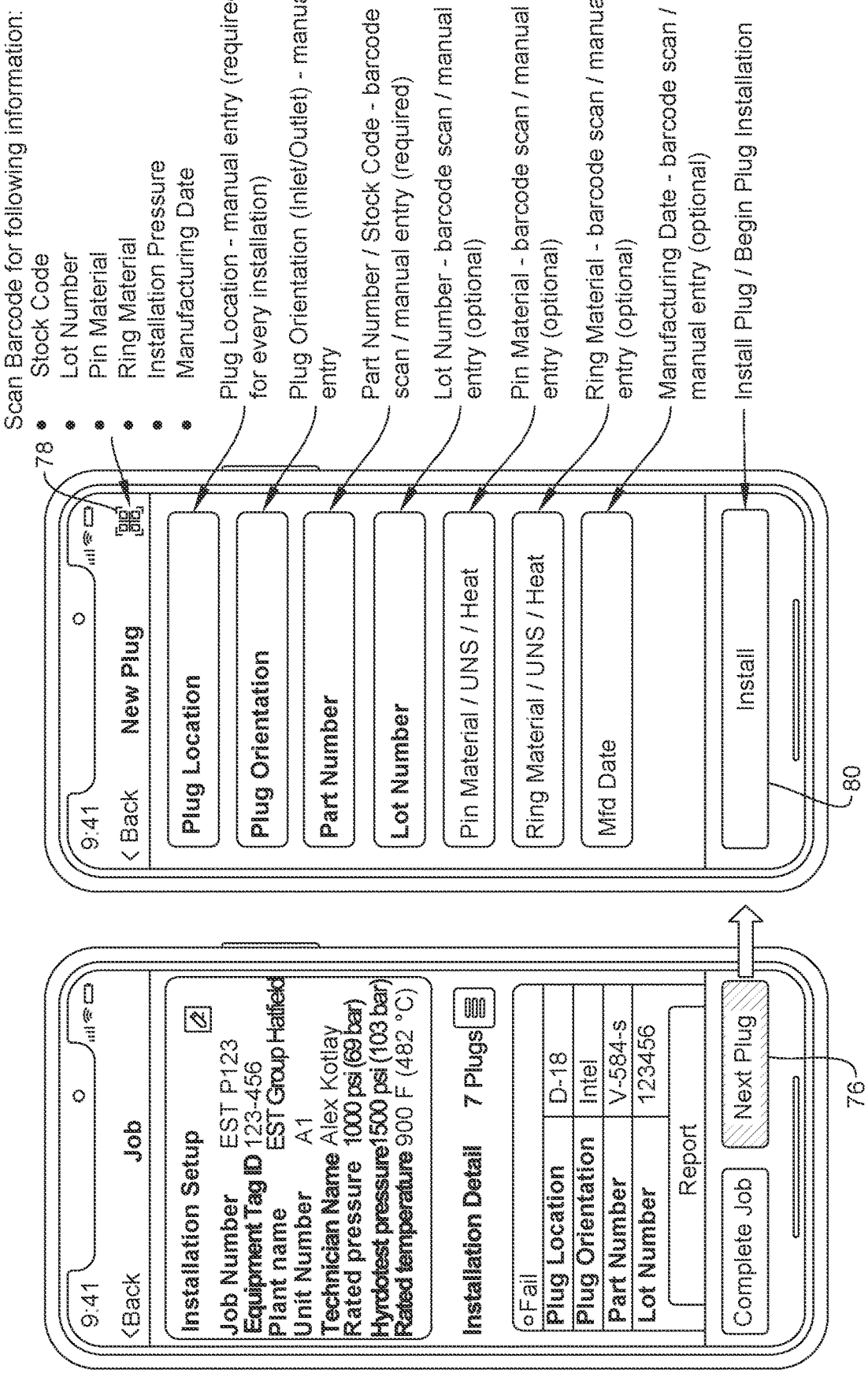
FIG. 8 is an image of a user interface of the App for use in entering data concerning a new plug to be installed in accordance with an embodiment.

If the "New Job" icon 64 is selected, such as shown in FIG. 7, information concerning the job is entered by the user. For instance, a new job number is entered, an equipment tag ID is entered (i.e., selected from a pull-down menu or the like or is newly created), and the technician's name is entered (i.e., selected from a pull-down menu or the like or is newly created).

When the install next plug icon 76 is selected, information concerning the proposed plug is entered, i.e., plug location, plug orientation (inlet/outlet), part number/stock code, lot number, pin material, ring material, plug manufacturing date, and the like may be entered. See FIG. 8. As one contemplated option, the plug may be provided with a bar code or the like and various information may be read, automatically entered, and stored by the App by reading the barcode with the device 50. Thus, a barcode scanning icon 78 may be provided for this purpose. FIG. 9 provides an example of information which might be automatically entered into the App for a job by scanning a barcode that may be included on a label of box containing the plug. As an alternative, the App may be able to automatically enter some of the information contained in FIG. 10 by entry of a lot number and subsequent automatic retrieval of information from a cloud server or the like. As another alternative, some or all of the information may require manual entry into the App.

After the equipment (i.e., heat exchanger or pressure vessel) information and plug information is entered, an install plug or begin plug installation icon 80 may appear. Selecting this icon will lead the technician through the steps as outlined in FIG. 1, the results of which will be collected and stored by the App.

A user may select the reports icon 56 (see FIGS. 11 and 12) for a particular job number which will provide installation details, information concerning the installed plug(s), and various installation graphs, for instance, relating to force applied during plug installation as measured during installation. Such reports may be generated and forwarded electronically (i.e., emailed) and/or sent to a printer or the like.

Figure 13:
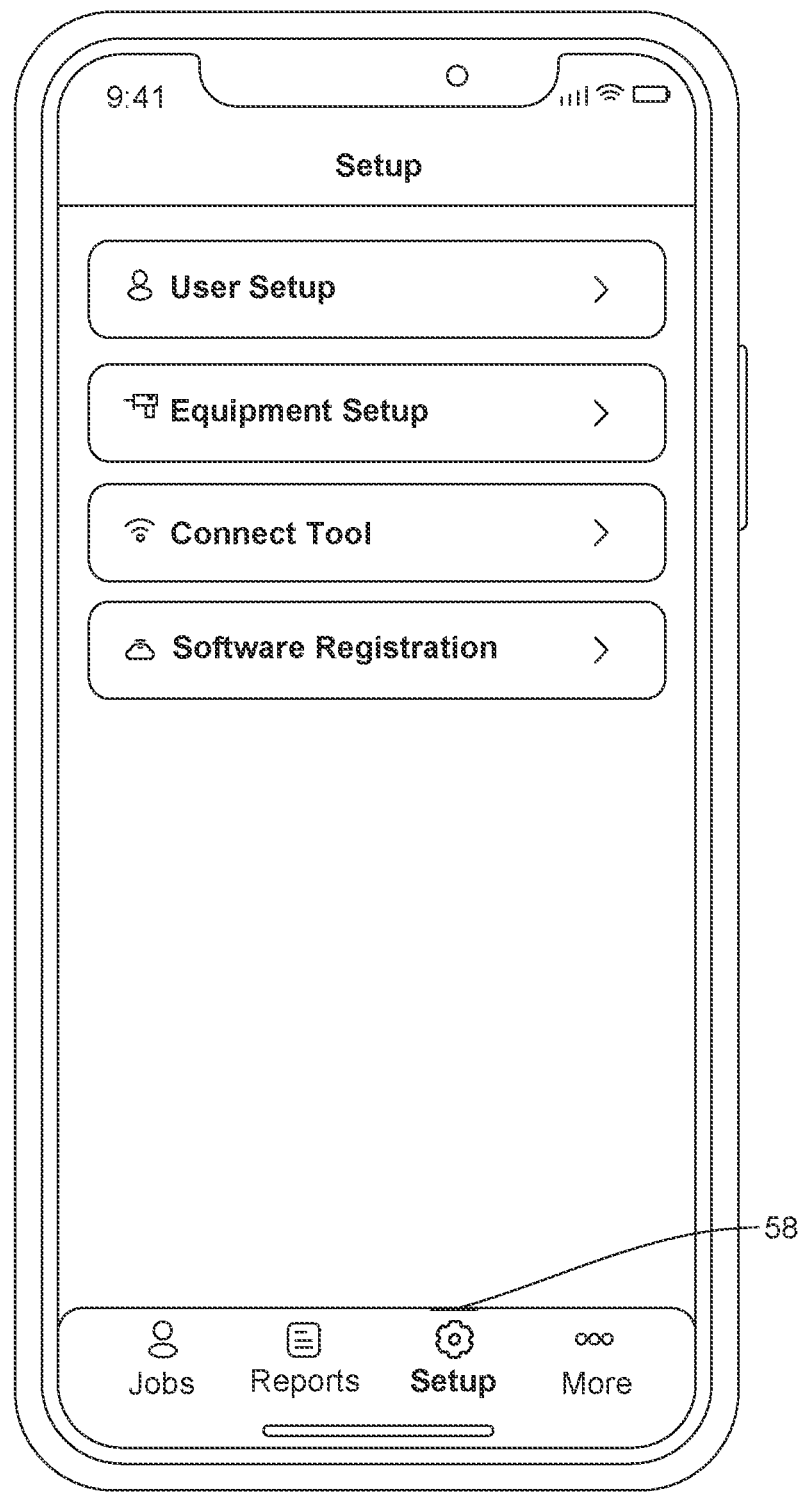
FIG. 13 is an image of a user interface of the App for setting up and entering new equipment or users in accordance with an embodiment.
Figure 14:
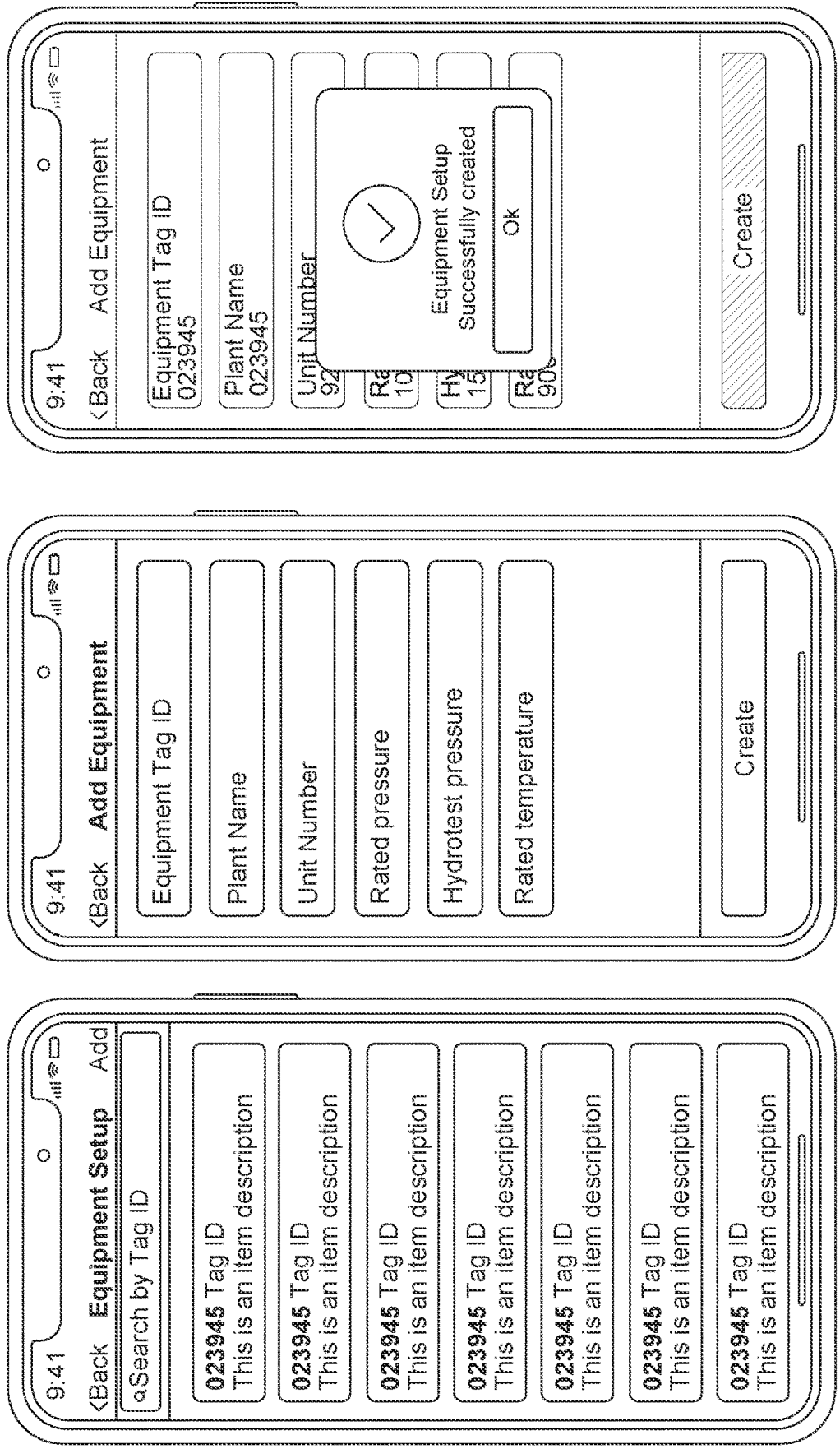
FIG. 14 is an image of a user interface of the App for viewing, searching, modifying, or entering equipment in accordance with an embodiment.
Figure 15:
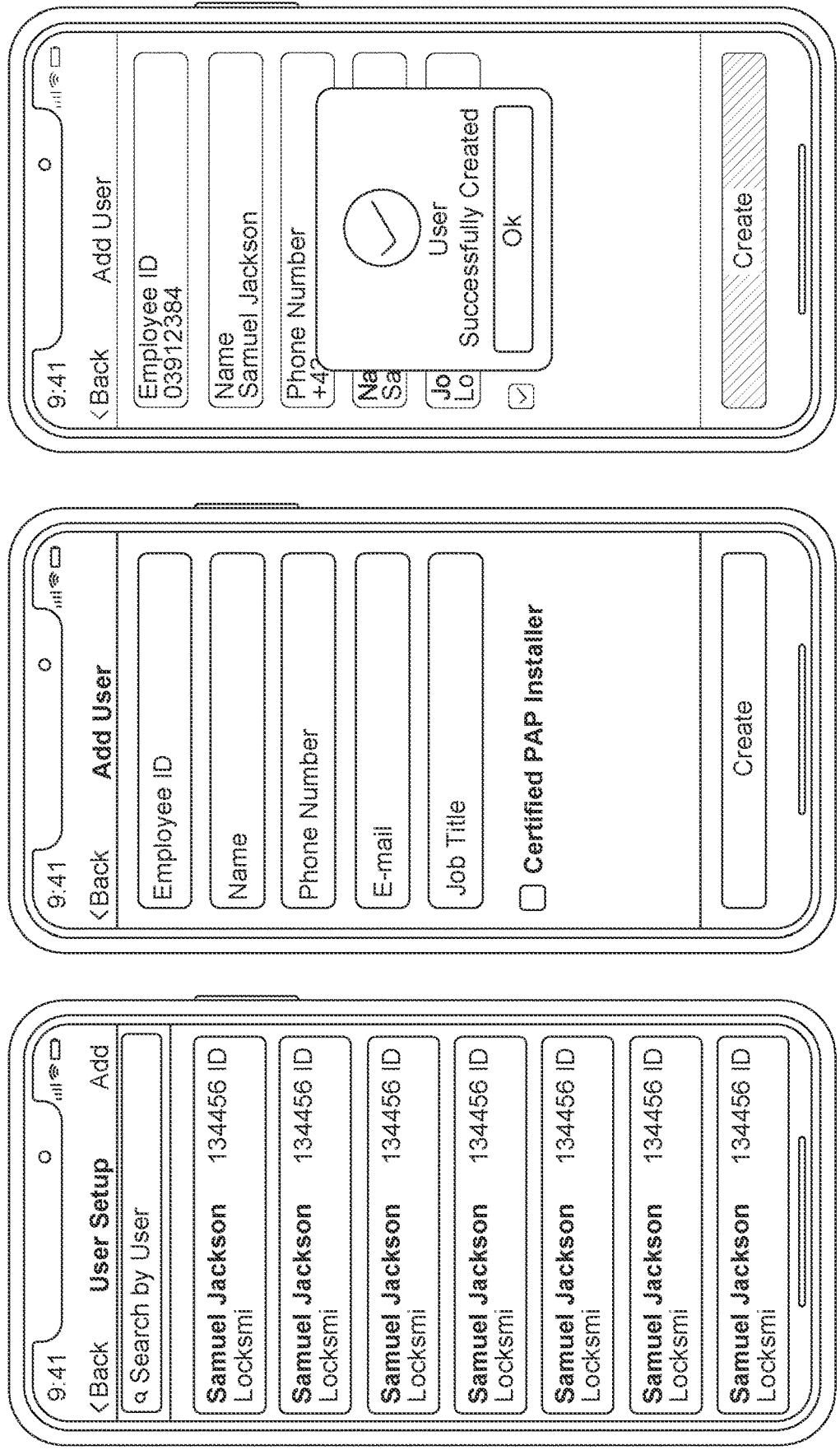
FIG. 15 is an image of a user interface of the App for viewing, searching, modifying, or entering users/technicians in accordance with an embodiment.
Figure 16:
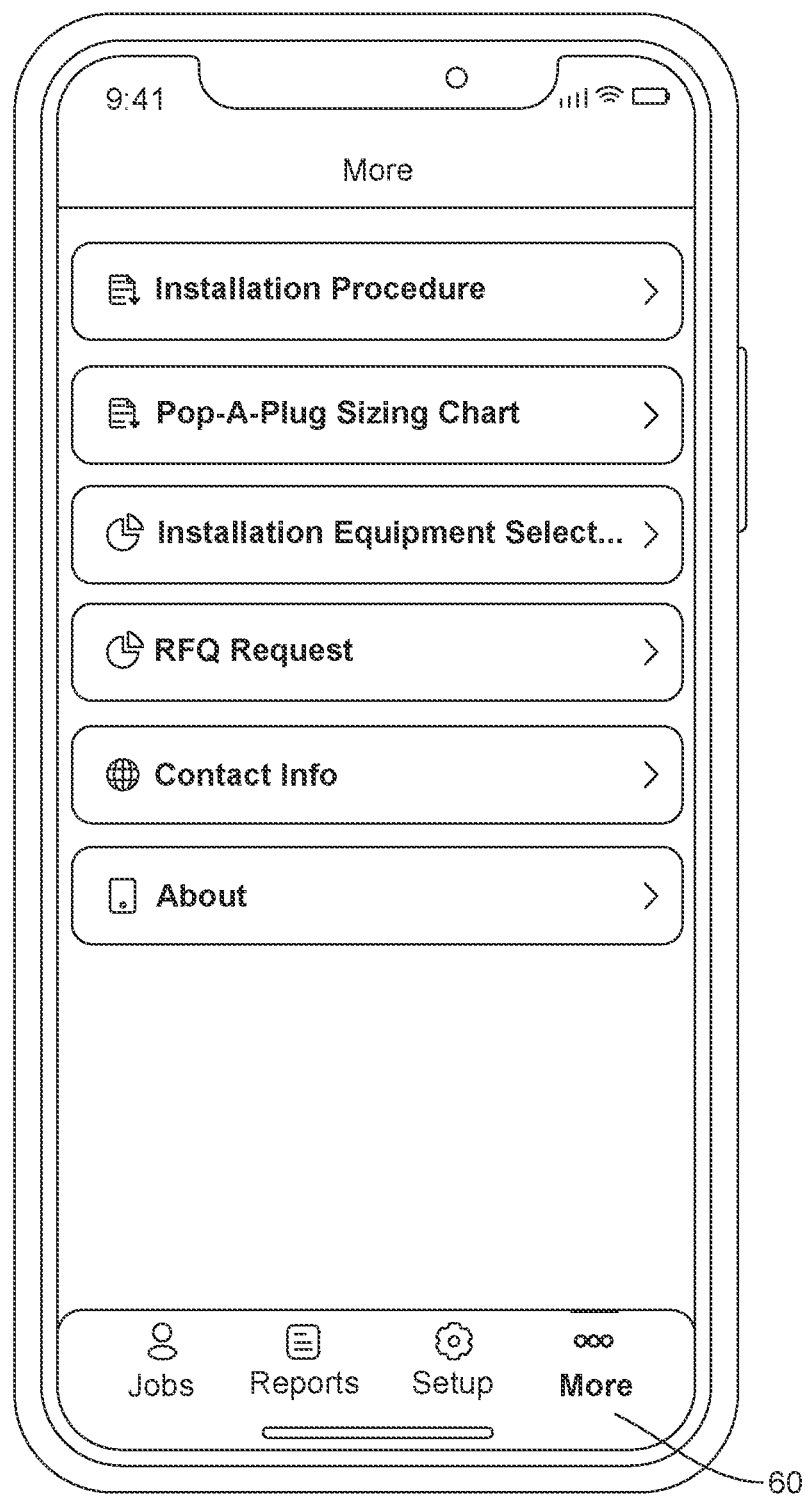
FIG. 16 is an image of a user interface of the App providing additional options in accordance with an embodiment.

The setup icon 58 may be selected to select or modify information relative to existing equipment or to add information concerning newly added heat exchanger equipment as shown in FIGS. 13 and 14. Searches of equipment may be performed to view stored information concerning a desired item of equipment. The information may include, for instance, equipment tag ID, plant name, unit number, rated pressure, hydrotest pressure, and rated temperature. In addition, a user/technician may be selected to modify user information, or a new user or technician may be added as shown in FIG. 15. Searches by username, employee ID, or the like may be performed. User information may include, for instance, employee ID, name, phone number, email address, and job title or the like.

The setup icon 58 may also present the user with options to pair the App to a separate installation tool (such as the tool shown in FIG. 2) and/or to register the software.

The more options icon 60 may be selected by a user for the purpose of obtaining information with respect to installation procedures, plug sizing charts, or any other information made available via the App. See FIG. 16.

Example—Installation Graphs

Figure 17:
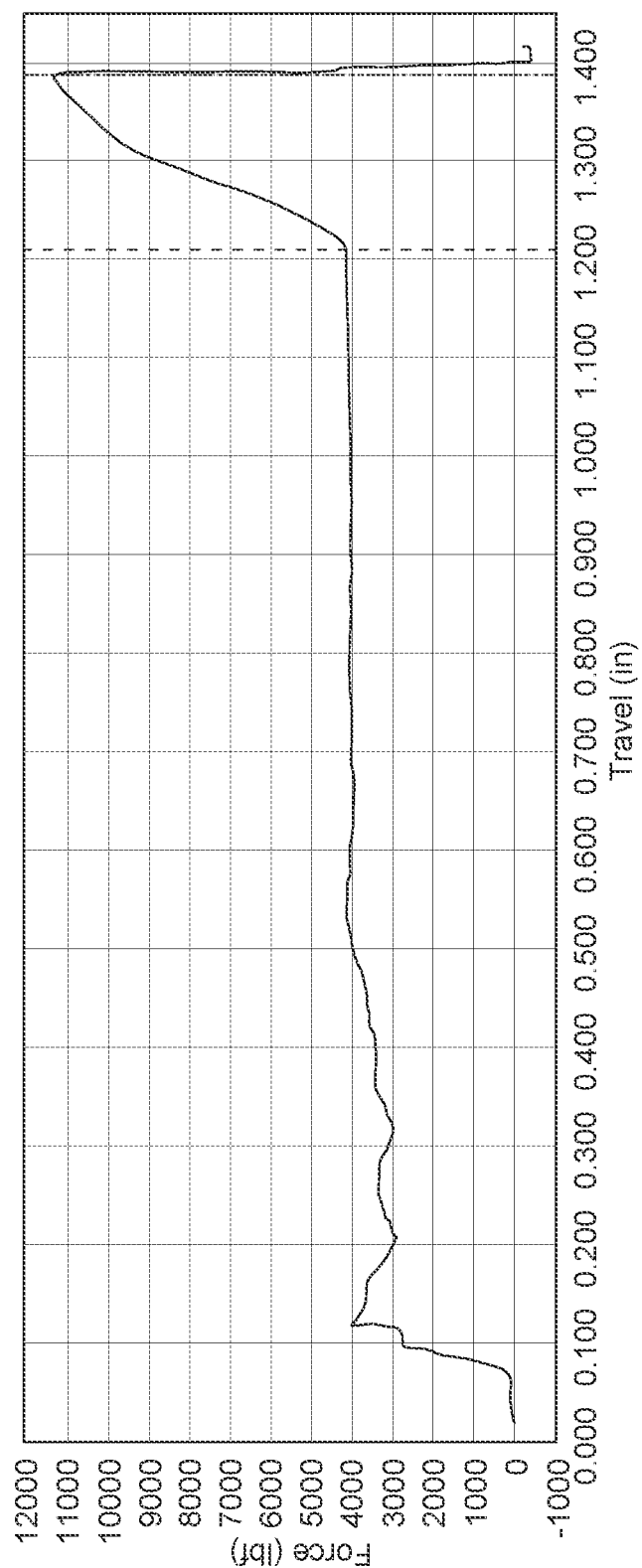
FIG. 17 is a graph showing force versus ring travel on the pin of a plug obtained by a production test stand in accordance with an embodiment.
Figure 18:
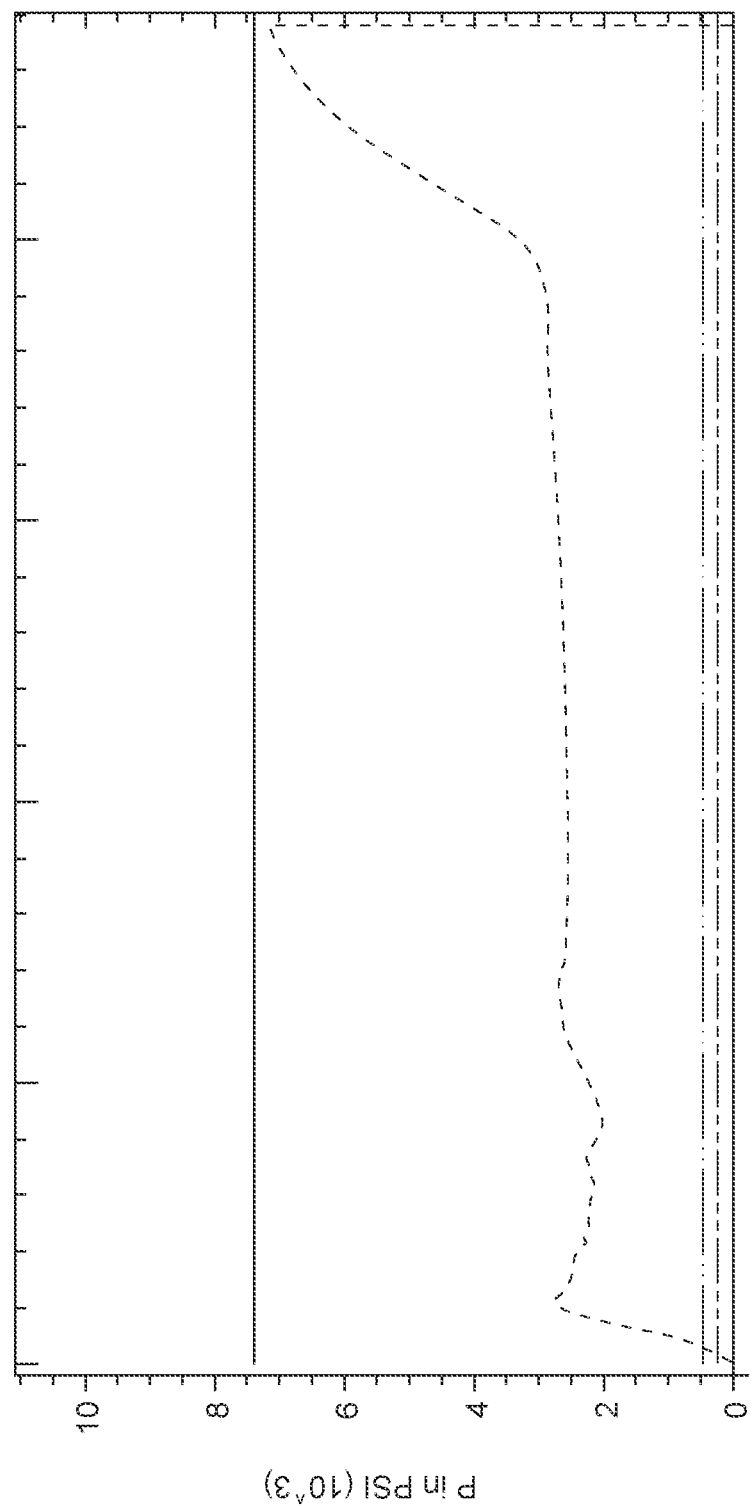
FIG. 18 is a graph showing cylinder pressure of an installation tool versus time obtained by use of an installation tool in accordance with an embodiment.

By way of example and not by way of limitation, FIGS. 17 and 18 provide installation graphs having data obtained from a production test stand (FIG. 17) and from use of an installation tool (FIG. 18), such as shown in FIG. 2, for purposes of comparison.

The graph shown in FIG. 17 provides data obtained from a production test stand in which the Y-axis relates to actual measured pulling force and the X-axis relates to the displacement of the ring of the plug on the pin of the plug. The graph shown in FIG. 18 provides data collected from an installation tool in which the Y-axis relates to actual measured cylinder pressure of the tool (which can be directly correlated to pulling force exerted on the plug) and the X-axis relates to time. Accordingly, abnormal plug installations are able to be detected using such data and the comparison thereof, even though different characteristics are being measured.

While a preferred embodiment of the present invention has been described in detail, various modifications, alterations, and changes may be made without departing from the spirit and scope of the present invention as defined in the appended claims.

We claim:

1. A device for installing a tube plug within a tube of a heat exchanger or pressure vessel, comprising:
   a hand-holdable tool having a base, a grip section, and a
      unit for applying force to the tube plug for displacing a pin of the tube plug relative to a ring of the tube plug within the tube of the heat exchanger or pressure vessel;

at least one processor located within said tool and having software configured to verify suitability of a selected tube plug with a specifically identified type of heat exchanger or pressure vessel before installation of the selected tube plug, and to receive or access data concerning the selected tube plug and received or accessed data concerning the specifically identified type of heat exchanger or pressure vessel and operating parameters of the specifically identified type of heat exchanger or pressure vessel;

wherein the tool is configured to obtain real-time measurements of installation parameters during installation of the tube plug.

2. The device according to claim 1, wherein the at least one processor is configured to confirm tube plug installation success or failure based on at least one of the real-time measurements taken during the installation.

3. The device according to claim 2, wherein the real-time measurement includes installation force.

4. The device according to claim 1, wherein the data concerning the selected tube plug includes at least one of tube plug rated pressure, tube plug rated temperature, tube plug material, and tube plug size, and wherein the data concerning the specifically identified type of heat exchanger or pressure vessel and the operating parameters of the specifically identified type of heat exchanger or pressure vessel include at least one of operating pressure, hydrotest pressure, operating temperature, tube material, and tube inner diameter.

5. The device according to claim 1, wherein the device is configured to automatically collect the tube plug installation data and to generate feedback on the tube plug installation data.

6. The device according to claim 1, wherein the tool includes a display screen on which at least one of the real-time measurements or an indication of the success or failure of the installation is displayable.

7. The device according to claim 1, wherein the tool is battery powered and includes an indication of remaining battery power.

8. The device according to claim 1, wherein the at least one processor of the tool enables wireless communication of data from the tool to external devices.

9. A device for installing a tube plug within a tube of a heat exchanger or pressure vessel, comprising:

a hand-holdable tool having a base, a grip section, and a unit for applying force to the tube plug for displacing a pin of the tube plug relative to a ring of the tube plug within the tube of the heat exchanger or pressure vessel;

wherein the tool is configured to obtain real-time measurements of installation parameters during installation of the tube plug and has at least one processor configured to confirm tube plug installation success or failure based on at least one of the real-time measurements taken during the installation.

10. The device according to claim 9, wherein the tool has a display screen on which at least one of the real-time measurements or an indication of the success or failure of the installation is displayable.

11. The device according to claim 9, wherein the tool is battery powered and includes an indication of remaining battery power.

12. The device according to claim 9, wherein the at least one processor of the tool enables wireless communication of data to external devices.

13. The device according to claim 9, wherein the real-time measurements include a measurement of installation force.

\* \* \* \* \*